July 26, 1938. H. J. KRACKOWIZER 2,124,981
REFRIGERATING METHOD AND APPARATUS
Filed June 15, 1936
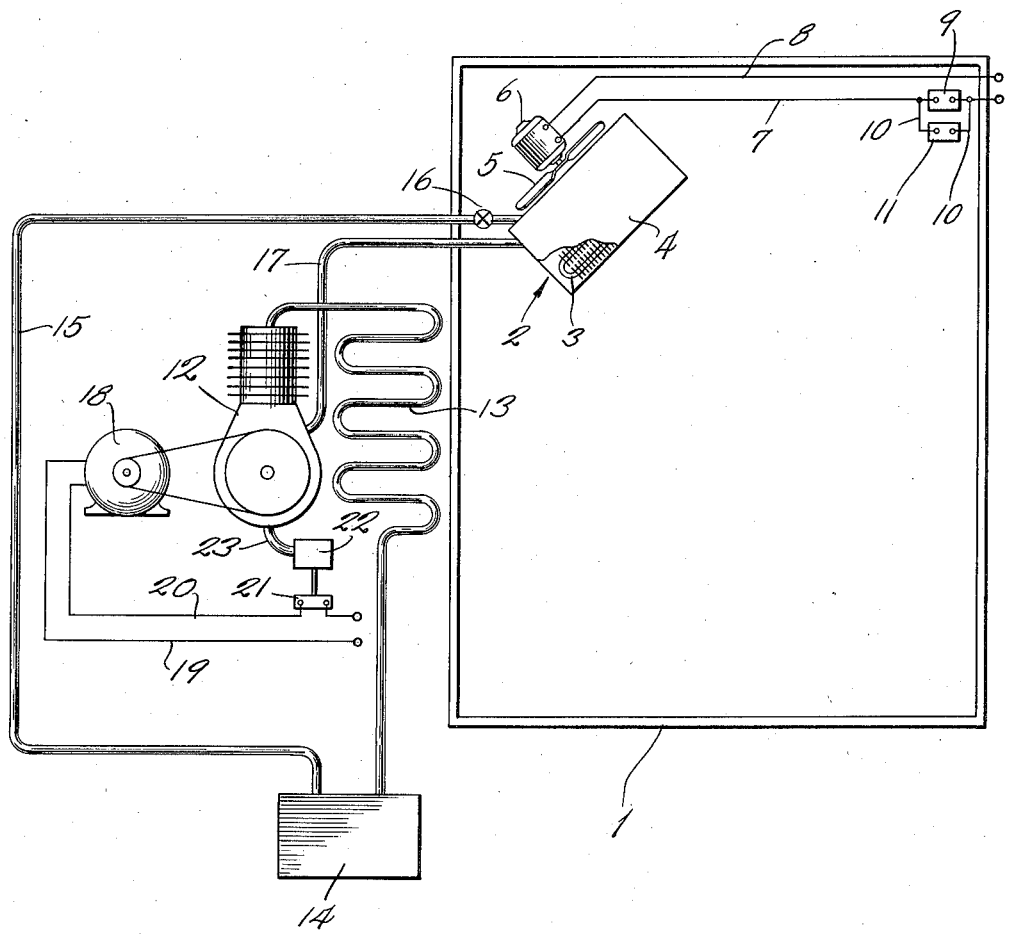
Inventor:
Hermann J. Krackowizer
By Eugene M. Giles
Atty.

Patented July 26, 1938

2,124,981

UNITED STATES PATENT OFFICE 2,124,981

REFRIGERATING METHOD AND APPARATUS

Hermann J. Krackowizer, Chicago, Ill.

Application June 15, 1936, Serial No. 85,204

8 Claims. (Cl. 62—4)

My invention relates to refrigerating systems of the type in which a refrigerant is automatically supplied to a cooling unit through which air is positively circulated, and has reference more particularly to improvements in the method of and instrumentalities for controlling the operation of such systems.

In refrigerating systems of the above mentioned types the refrigerant is commonly supplied to the cooling unit from a compressor which is automatically controlled by a pressurestat so as to discontinue operation upon a predetermined reduction of pressure in the expansion or low side of the system and to resume operation upon a predetermined increase in pressure in that side of the system, and in such systems, the cooling unit, which is usually located in the compartment that is to be cooled, is preferably arranged for positive circulation and re-circulation of the compartment air therethrough by suitable means, such as a fan.

These systems are used quite extensively for cooling food storage compartments, etc. in which it is important not only to maintain a positive uniform temperature, but also to maintain the proper condition of relative humidity which is necessary for satisfactory preservation of foods and the like, and it is particularly desirable to avoid accumulation of frost on the cooling unit as this not only impairs the efficiency of the cooling system as well as the accuracy of the temperature control, but also deprives the air of the moisture which is essential for the proper condition of humidity.

It has been found that when the fan operates continuously at the same rate of speed during the on and off cycles of refrigerant supply, the above mentioned desirable and necessary conditions for satisfactory cooling are not obtained as the continual flow of air through the cooling unit at a rate sufficiently fast for heat exchange at the intended capacity of the machine prolongs the cycles of operation and builds up an excessive cooling effect of the cooling unit before the operation of the compressor is discontinued, with the result that frost accumulates and a factor of inaccuracy is introduced in the temperature control, while continuous flow of air at a slower rate only augments these objectionable operating conditions. Other controls have also been proposed, such as intermittent operation of the fan through a thermostatic control which starts and stops the fan respectively at selected low and high temperatures, but this introduces a factor of inaccuracy due to absence of air circulation with resultant unevenness of temperature at different locations in the compartment and this, together with the discontinuance of positive air circulation through the cooling unit permits objectionable accumulation of frost.

The principal objects of my invention are to avoid the objectionable conditions that have been experienced with previous refrigerating systems of the type above mentioned; to avoid accumulation of frost on the cooling unit and maintain a proper condition of relative humidity; to insure positive circulation of air at all times and accurate control of the temperature and maintain a uniform, positive temperature in the compartment; to increase the efficiency of the system and avoid waste of power; and in general to improve the operation of refrigerating systems.

In the accompanying drawing which illustrates somewhat diagrammatically an embodiment of my invention, the reference numeral 1 indicates a compartment, the interior of which is to be maintained at a suitable low temperature to preserve foods and the like, and 2 is a cooling or heat exchange unit of any desired type which usually consists of coils 3 to which a refrigerant is supplied and in which it is evaporated to extract heat from the air in the compartment 1, and these coils are located in a casing 4 which is open at opposite sides to provide for circulation of air therethrough and between and past the coils 3. At one open side of the cooling unit 2 is a fan 5 operated by an electric motor 6 to which current is supplied from any suitable source by the conductors 7 and 8, one of which leads through a resistance or reactor 9 around which is a by-pass circuit 10 through a thermostatically controlled switch 11 which is responsive to the changes of temperature in the compartment 1 and operates to close the switch when the temperature in the compartment 1 reaches a predetermined high point and to open the switch and break the circuit through the by-pass 10 when the temperature reaches a predetermined low point. Such switches are well known and are usually arranged for adjustment so that the switch may be caused to open and close at selected temperatures.

The rest of the refrigerating apparatus may be of the usual type, comprising a compressor 12 from which the compressed refrigerant is discharged through a condenser 13 into the receiver 14 from which the compressed and condensed refrigerant is supplied through the pipe 15 and the usual expansion valve 16 to the coil 3 of the cooling unit, from which the evaporated refrigerant is returned to the compressor 12 through the pipe 17. The compressor 12 is operated by an electric motor 18 to which current is supplied from any suitable source through the conductors 19 and 20 and the supply of current to the motor is controlled by a switch 21 which is in turn controlled by a pressurestat 22 which is connected in the usual manner as at 23 to the expansion (low) side of the refrigerating system so that reduction in pressure of the expanded refrigerant to a selected pressure opens the switch 21 and interrupts the operation of the motor 18, while increase in pressure of the expanded refrigerant to a selected pressure closes the switch 21 and causes the motor 18 and the compressor 12 to resume operation.

In the operation of the above described refrigerating system, the thermostat 11 is preferably adjusted to operate within a narrow range of temperature change, as for example, between 36 degrees and 39 degrees Fahrenheit, so as to maintain a comparatively constant and uniform temperature in the compartment and with this suggested temperature adjustment closes the switch 11 at the suggested high temperature of 39 degrees Fahrenheit and by-passes the resistance or reactor 9, whereupon the motor 6 operates the fan 5 at its normal high speed. When the temperature in the compartment 1 reaches the suggested low temperature of 36 degrees Fahrenheit, the switch 11 is opened whereupon the supply of current to the fan is through the resistance or reactor 9 and this is preferably of suitable capacity to reduce the speed of the motor 6 and fan 5 about 30–40 per cent.

Assuming that the compressor 12 is in operation and the thermostatic switch 11 is closed, the fan 5 will be operating at high speed and the air in the compartment 1 will be circulated and recirculated quite rapidly through the cooling unit 2, with a large volume of air coming in contact with the coils 3 and a correspondingly increased transfer of heat from the air to the refrigerant in the coils. This not only expedites the cooling of the compartment to the selected low temperature, but avoids a long cycle of operation of the refrigerating apparatus and excessive cooling of the coils 3 which would be occasioned by slower air circulation and would tend to cause accumulation of frost in the cooling unit. Such accumulation of frost not only diminishes the efficiency of the cooling unit and imposes excessive load on the refrigerating apparatus, but takes out of the air the moisture that is necessary to maintain the proper condition of relative humidity for satisfactory preservation of foods and the like, and upon subsequent melting, this moisture accumulates in the form of water on the coils and in the cooling unit and causes objectionable wetting of parts of the compartment adjacent to the cooling unit and the foods therein, or is drained away from the cooling unit and compartment with a resultant loss of necessary moisture from the air of the compartment. With my present refrigerating system, there is no accumulation of frost and loss of moisture. As soon as the temperature in the compartment is reduced to the suggested low temperature of 36 degrees Fahrenheit, the switch 11 is opened and the speed of the fan 5 thereupon reduced approximately 30–40 percent of the normal high speed. This immediately diminishes the volume of air circulated through the cooling unit with a corresponding decrease in the capacity of the cooling unit 2, due to a lessening of heat transfer from the air to the refrigerant in the coils 3 which slows down vaporization and reduces the pressure in the expansion (low) side of the system and causes the compressor to pump down and stop through the operation of the switch 21 by the pressurestat 22, which may be set, for example, to open the switch 21 at a pressure of ten pounds and to close the switch at a pressure of twenty-seven pounds. Obviously, this pressurestat is effective to start and stop the compressor irrespective of the operation of the thermostatic switch 11 and will start the compressor upon any increase in pressure to the suggested twenty-seven pounds in the expansion (low) side of the refrigerating system regardless of the speed of the fan 5. When, however, the thermostatic switch 11 closes upon reaching the suggested temperature of 39 degrees Fahrenheit and the fan resumes operation at high speed, it immediately increases the capacity of the cooling unit 2 and if the pressure in the expansion side of the system is below the compressor operating pressure of the pressurestat 22, the accelerated expansion of the refrigerant, due to the larger volume of air passing through the cooling unit 2, will build up the pressure so as to operate the pressurestat 22 to start the compressor 12.

Thus there is continuous circulation of air through the cooling unit during both the on and off cycles of the intermittent supply of refrigerant thereto, the volume of circulating air however being reduced during the off cycle. While the pressurestat 22 is an independently operable control, its operation is modified or influenced by the thermostat 11 so that the two controls conjointly insure greater efficiency with a saving of power, and any objectionable frosting or loss of moisture in the compartment is avoided, while the constant positive air circulation together with the cooperation of the controls insures the maintaining of a positive uniform temperature and proper relative humidity in the compartment.

While I have shown and described my invention in a preferred form, I am aware that various changes and modifications may be made without departing from the principles of my invention, the scope of which is to be determined by the appended claims.

I claim as my invention:

1. In a refrigerating system, the combination of a heat exchange unit, a device which supplies a refrigereant to said unit for absorbing heat, a continuously operable impeller by which circulation is maintained continuously through said unit of a medium from which heat is extracted by the refrigerant, and a thermostatic control responsive to changes in the temperature of said medium and operable to vary the speed of the continuously operable impeller to regulate the volume of the continuously circulating medium that is supplied to said unit.

2. In a refrigerating system, the combination of a heat exchange unit, an intermittently operable device which supplies a refrigerant to said unit for absorbing heat, means for maintaining continuous circulation through said unit of a medium from which heat is extracted by the refrigerant, a thermostatic control responsive to changes in the temperature of said medium and operable to regulate the volume of the continuously circulating medium that is supplied to said unit, and means whereby such regulation of volume modifies the intermittent operation of the intermittently operable device.

3. In a refrigerating system, the combination of a compartment, a cooling unit for the compartment, an intermittently operable device which supplies a refrigerant to said unit for absorbing heat, a continuously operable two speed blower which circulates the compartment air continuously through the cooling unit, and a thermostat in the compartment which alternately changes the speed of the blower according to variation of temperature in the compartment.

4. In a refrigerating system the combination of a compartment, a cooling unit for the compartment, an intermittently operable device which supplies a refrigerant to said unit for absorbing heat, a continuously operable blower which circulates the compartment air continuously through the cooling unit, a speed reducer for the blower, and a thermostat in the compartment responsive to changes in the compartment temperature to alternately operate the blower with and without the speed reducer.

5. A refrigerating method which comprises supplying refrigerant intermittently to a cooling unit, positively circulating air through said cooling unit during the on and off cycles of the intermittent refrigerant supply, and increasing the volume of such air circulation during the on cycles of the intermittent refrigerant supply.

6. A refrigerating method which comprises supplying refrigerant intermittently to a cooling unit, positively circulating air through said cooling unit during the on and off cycles of the intermittent refrigerant supply, and alternately increasing and decreasing the volume of such positive air circulation during the on and off cycles respectively of the intermittent refrigerant supply.

7. In a refrigerating system the combination of a heat exchange unit, means which positively circulates air through said unit, and a device operable intermittently to supply refrigerant to said unit to absorb heat from the air circulating therethrough, said air circulating means being operable to circulate relatively large and small volumes of air through the unit during the on and off cycles respectively of the intermittently operable refrigerant supplying device.

8. In a refrigerating system the combination of a heat exchange unit, means which positively circulates air through said unit, a device operable intermittently to supply refrigerant to said unit to absorb heat from the air circulating therethrough, said air circulating means being operable to circulate air through the unit during the on and off cycles respectively of the intermittently operable refrigerant supplying device, and control means by which the air circulating means is operated at a relatively low speed during the off cycles of the refrigerant supplying device and at a relatively high speed during the on cycle thereof.

HERMANN J. KRACKOWIZER.